Aug. 13, 1963   G. JACOBS ETAL   3,100,828
SOURCE OF RADIATION FOR INFRARED SPECTROPHOTOMETERS
Filed Sept. 7, 1960
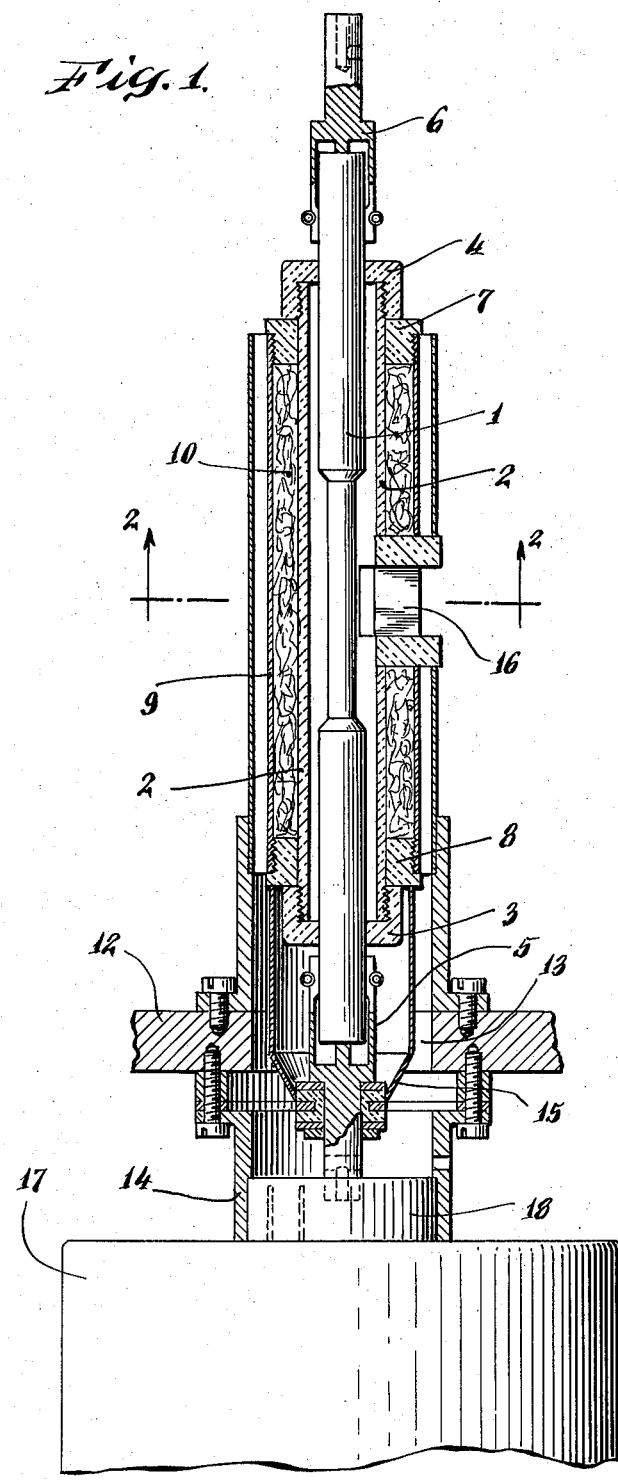
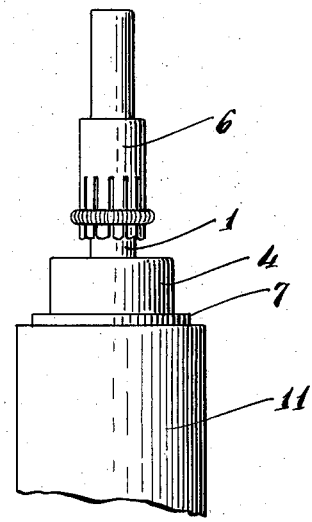
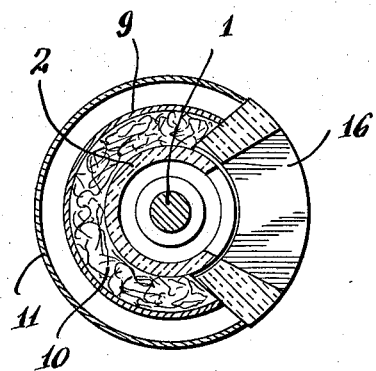
FLUID SUPPLY
INVENTORS.
Gerhard Jacobs
BY Albert Melcher
ATTORNEY.

United States Patent Office 3,100,828
Patented Aug. 13, 1963

3,100,828
SOURCE OF RADIATION FOR INFRARED
SPECTROPHOTOMETERS
Gerhard Jacobs, 37 Friedhofstrasse, Ueberlingen (Bodensee), Germany, and Albert Melcher, 4 Goldbach, uber Ueberlingen (Bodensee), Germany
Filed Sept. 7, 1960, Ser. No. 54,539
Claims priority, application Germany Sept. 8, 1959
6 Claims. (Cl. 219—34)

This invention relates to a radiation source for infrared spectrophotometers.

In accordance with the invention a glow bar, preferably a silicon carbide bar, serves as a radiator and is enclosed by a casing cooled by a cooling agent. The purpose of the cooling is to dissipate the energy being emitted towards the surroundings of the radiation source by radiation and heat conduction. Consequently, no undue warming of the surrounding parts of the instrument can take place. In prior art instruments of this type water is being used for cooling purposes. This proves to be disadvantageous for several reasons. For example, a water connection is required near the spectrophotometer. This is not always available. Above all, it is undesirable to lead water into such an instrument as it is rather sensitive and contains moisture-sensitive parts. Due to leaks or mix-up of connections considerable damage might occur.

The primary object of this invention is to avoid these disadvantages. The invention is based on the realization that sufficient cooling is obtained if the casing is air-cooled in accordance with the following disclosure.

A further object of the invention is to mount the glow bar in such a way that it can easily be replaced. In a further modification of the invention a threaded ceramic sleeve encloses and is spaced from the glow bar. Both ends of the glow bar, preferably thickened, are kept centered by guide bushings consisting of ceramic material and screwed onto the sleeve. The glow bar can then be inserted with its lower end in an elastic socket serving as one current supplier, and an elastic cap can be put on the upper end of the glow bar to serve as the second current supplier. After taking off the upper current supply the glow bar can be removed from the sleeve and from the lower socket without any difficulty. After a new glow bar is inserted the source of radiation need not be adjusted again, but it is possible to start measuring again immediately after the current supply cap has been put on.

It is expedient to have the ceramic sleeve connected with the metal casing by means of screwed-on guard rings and to have the space between the sleeve and the casing filled with insulation material, preferably micro-quartz fiber wool.

An embodiment of the invention is presented in the drawings and described as follows:

FIG. 1 shows a longitudinal section of a radiation source according to the invention, FIG. 2 shows a cross-section on line II—II of FIG. 1, FIG. 3 is a view of the upper current supply.

FIG. 1 designates a silicon carbide bar (Globar) 1 serving as a radiator. It is enclosed by a threaded sleeve 2 made of ceramic material. Guide bushings 3, 4 are screwed onto the threaded sleeve 2 at each end and keep the thickened ends of bar 1 centered. Bar 1 is inserted with its lower end into an elastic socket 5 serving as an electrical terminal. The other end is enclosed by an elastic cap 6 (FIG. 3) which serves as the second terminal. Sleeve 2 is connected with a metal casing 9 by means of guard rings 7, 8, screwed onto it. The guard rings also consist of ceramic material. The space between sleeve 2 and casing 9 is filled with a heat-insulating layer 10 of micro-quartz fiber wool.

Casing 9 is polished on the inside and silver-bronze plated on the outside. The whole structure is assembled and mounted in a tubular casing 11 being fastened with a flange to a base plate 12 over an opening 13. On the other side of the base plate a hose connection socket 14 is provided enclosing opening 13. Socket 5 is enclosed by a funnel-shaped deflector 15 at the upper end of which the metal casing is connected.

A blower or fluid supply 17 is connected to socket 14 over a hose 18. The cool air flow passes by the deflector 15. Thus heat is carried away which flows from the end of bar 1 to socket 5 by conduction and from there to the deflector. The cool air passes through the channel formed between casing 9 and casing 11 and cools casing 9 and then flows across the connection cap 6 which lies in the cool air flow. The cool air is kept from direct contact with the glow bar 1, because this would naturally result in unsteady and undefined temperatures of the glow bar.

In the center a window 16 is provided so that the desired radiation can pass into the instrument.

Thus the result of the combined cooling and insulation is that the temperature of the exterior casing of the light source assembly goes no higher than 212° F. and radiates almost no extraneous heat. Thus there is no danger to mirrors mounted near the source or for other heat sensitive parts of the spectrophotometer. The temperature of the radiation source of one embodiment of the invention is 2552° F., the power input being approximately 250 watts.

We claim:

1. An infrared radiation source which comprises a heated electrical conductor; a radiation impermeable casing surrounding said conductor, said casing defining an opening for the passage therethrough of radiation from said conductor and a conduit for the passage of a cooling gas along said casing; and means for injecting a cooling gas into said conduit.

2. The apparatus of claim 1 wherein said conductor is substantially rod-like and said casing comprises spaced concentric cylinders.

3. The apparatus of claim 2 wherein said casing comprises an inner heat insulating cylinder and an outer metallic cylinder forming said conduit therebetween.

4. The apparatus of claim 3 wherein said inner cylinder comprises an inner tubular ceramic sleeve, an outer tubular metallic sleeve concentric with said inner sleeve and spaced therefrom, and a heat insulating material filling the space between said sleeves.

5. The apparatus of claim 4 wherein the concentricity between the inner and outer sleeves forming said inner cylinder is maintained by a first washer-like ceramic spacer at the first ends of said sleeves and a second washer-like ceramic spacer at the second ends of said sleeves.

6. An infrared radiation source which comprises a silicon carbide rod having a narrowed central portion; a tubular ceramic sleeve surrounding said rod but spaced therefrom, said sleeve being shorter than said rod; a first cup-shaped bushing member fitting over a first end of said ceramic sleeve and defining a first opening for the retention of a first end of said rod therein; a second cup-shaped bushing member fitting over a second end of said ceramic sleeve and defining a second opening for the retention of a second end of said rod therein; a first tubular metallic sleeve surrounding said ceramic sleeve but spaced therefrom; separating means for maintaining said ceramic sleeve and said first metallic sleeve in spaced relationship; a heat insulating material filling the space between said ceramic sleeve and said first metallic sleeve; a second tubular metallic sleeve surrounding said first metallic sleeve but spaced therefrom to form a fluid passage therebetween, all of said first and second metallic sleeves and said ceramic sleeve defining a common opening for the passage of radiation from the central portion of said rod; fluid flow supply means adapted to supply fluid to said fluid passage; first electrical terminal means connected to the first end of said rod and positioned in heat transfer relationship with said fluid; and second electrical terminal means connected to the second end of said rod and positioned in the fluid flow.

References Cited in the file of this patent

UNITED STATES PATENTS

| | | |
|---|---|---|
| 1,199,039 | Ray | Sept. 19, 1916 |
| 1,593,725 | Sharpe | July 27, 1926 |
| 1,983,327 | Unglelenk | Dec. 4, 1934 |
| 2,105,430 | Metcalf | Jan. 11, 1938 |
| 2,784,335 | Munday | Mar. 5, 1957 |
| 2,858,403 | Butler | Oct. 28, 1958 |
| 2,972,053 | Anderson | Feb. 14, 1961 |